United States Patent Office
3,775,486
Patented Nov. 27, 1973

3,775,486
1,7-DIHYDROXY BENZ[e]INDANES
Leland J. Chinn, Morton Grove, Ill., assignor to G. D. Searle & Co., Chicago, Ill.
No Drawing. Filed June 1, 1972, Ser. No. 258,536
Int. Cl. C07c 43/20
U.S. Cl. 260—613 R
3 Claims

ABSTRACT OF THE DISCLOSURE 1,7 - dihydroxybenz[e]indane derivatives herein described exhibit anti-inflammatory activity. These substances can be prepared in several steps from [3-(6-hydroxy-2-naphthyl)]-2,2-dialkylalkanoic acid derivatives.

---

The present invention relates to a group of substituted 1,7-dihydroxybenz[e]indane derivatives having the following General Formula I

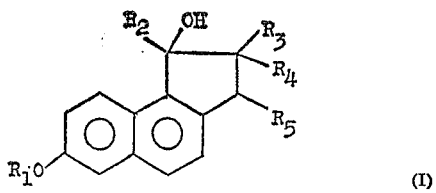

wherein $R_1$, $R_3$, $R_4$ and $R_5$ represent a lower alkyl radical and $R_2$ represents a phenyl or p-halophenyl radical.

These compounds are useful in that they exhibit anti-inflammatory activity. This activity is demonstrated by the results of standardized tests for their capacity to inhibit the edema induced in rats by injection of carrageenin. The procedure is a modification of one described by Winter et al., Proc. Exper. Biol. and Med. 111, 544 (1962).

Introduction of carrageenin into the foot induces a local inflammatory response manifested as an edematous swelling in the surrounding tissue. Compounds which inhibit the swelling are considered to be anti-inflammatory agents and well recognized anti-inflammatory agents such as hydrocortisone, Butazolidin, aspirin and indomethacin inhibit this edematous swelling. Male rats, weighing 120 gms., are used in the tests. The animals receive a subcutaneous 25 mg. (in corn oil) dose of the herein described compounds. One hour after administration of the test compounds the hind feet of the test animals are injected with a 1% saline solution of carrageenin (Marine Colloids Inc., Type 402). A dose of a compound is rated active if it causes a significant decrease ($P<0.05$) in the circumference of the feet 6 hours after administration of the test compound as compared to control animals treated with Hydrocortisone. A compound is considered active if it has $\geq 1\%$ of the activity of Hydrocortisone.

The present substances are in general prepared as shown in scheme A. This process begins with 3-(6-alkoxy-2-naphthyl)-2,2-dialkylalkanoic acid derivatives described in U.S. Pat. 2,547,123.

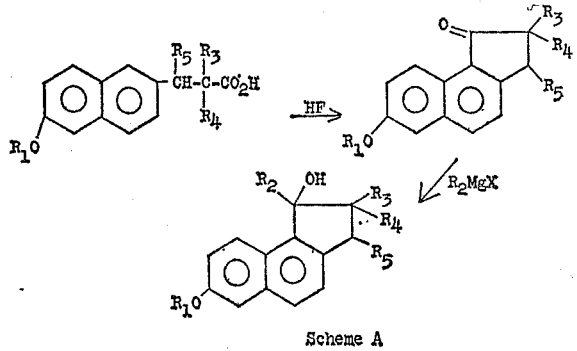

Scheme A

The 3-(6-alkoxynaphthyl)-2,2-dialkylalkanoic acids are converted to the ketonic precursor in scheme A by contacting the organic acids with hydrofluoric acid followed by evaporation of the hydrofluoric acid. The resulting ketones are purified and converted to the final alcohol product in scheme A by reacting the ketanoic intermediate with the desired organomagnesium halide under normal Grignard reaction conditions. In this manner 3-(6-methoxynaphthyl)-2,2-dimethylpentanoic acid is converted to 2,2-dimethyl-3-ethyl-7-methoxybenz[e]indan-1-one. The reaction of the latter with phenylmagnesium bromide provides 1-phenyl - 2,2 - dimethyl-3-ethyl-7-methoxybenz[e]indan-1-ol.

The following examples are presented to further illustrate the present invention. They should not be construed as limiting it either in spirit or in scope. In these examples quantities are indicated in parts by weight unless parts by volume are specified, and temperatures are indicated in degrees centigrade (° C.). The relationship between parts by weight and parts by volume is the same as that existing between grams and milliliters.

EXAMPLE 1

70 parts of 2,2-dimethyl-3-(6-methoxy-2-naphthyl)pentanoic acid is completely covered with a layer of liquid hydrogen fluoride in a polyethylene container. The mixture is allowed to stand in the open at ambient temperature for 20 hours, during which time the hydrogen fluoride evaporates. The residue is treated with water and the resulting mixture is extracted with ether. The ether extracts are combined and washed successively with water, 2% aqueous sodium hydroxide solution and water. The ethereal layer is separated and dried over anhydrous sodium sulfate. The sodium sulfate is removed by suction filtration and the ether is then removed by evaporation under reduced pressure. Trituration of the solid with hexane provides the intermediate ketone, 2,2-dimethyl-3-ethyl-7-methoxybenz[e]indan-1-one, M.P. 88–91°. This compound is represented by the following formula

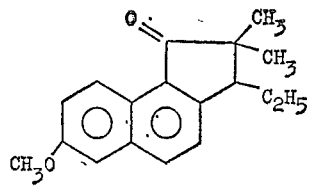

EXAMPLE 2

To 60 parts by volume of diethyl ether containing 3.3 parts of phenylmagnesium bromide is added with stirring a solution of 6 parts of 2,2-dimethyl-3-ethyl-7-methoxybenz[e]indan-1-one in 90 parts by volume of diethyl ether. The reaction mixture is stirred and heated under reflux for 21 hours. Then it is cooled in an ice bath and treated with saturated ammonium chloride solution. The ether phase is separated and washed with water. The ethereal layer is isolated with dried over anhydrous sodium sulfate. The sodium sulfate is removed by suction filtration and the ether is removed by distillation under reduced pressure. This procedure produces a viscous oil which is chromatographed on 1000 parts of silica gel. Elution of the column with a 15% hexane-85% benzene solution provides a solid product and recrystallization of that solid from 10% ether-90% hexane affords pure 1-phenyl-2,2-dimethyl-3-ethyl-7- methoxybenz[e]indan-1-ol, M.P. 97–100°. This compound is represented by the following formula

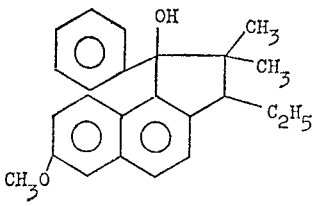

EXAMPLE 3

3 parts of p-chlorophenylmagnesium bromide and 6 parts of 2,2-dimethyl-3-ethyl-7-methoxybenz[e]indan-1-one are reacted exactly as described in Example 2. The reaction is worked-up and the product is isolated also as described in Example 2. Recrystallization of the chromatographed product from hexane provides 1-p-chlorophenyl-2,2-dimethyl - 3 - ethyl-7-methoxybenz[e]indan-1-ol, M.P. 60–62°. This compound is represented by the following formula

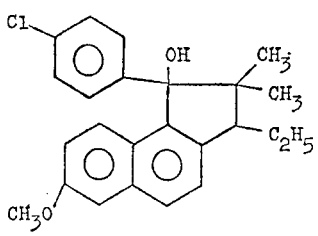

EXAMPLE 4

3 parts of p-bromophenylmagnesium bromide and 6 parts of 2,2-dimethyl-3-ethyl-7-methoxybenz[e]indan-1-one are reacted exactly as described in Example 2. The reaction is worked-up and the product is isolated also as described in Example 2. Recrystallization of the chromatographed product from hexane provides 1-p-bromophenyl-2,2-dimethyl-3-ethyl - 7 - methoxybenz[e]indan-1-ol. This compound is represented by the following formula

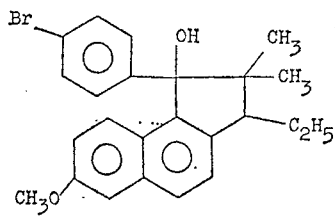

EXAMPLE 5

70 parts of 2,2-dimethyl-3-(6-ethoxy-2-naphthyl)hexanoic acid is converted to 2,2-dimethyl-3-propyl-7-ethoxybenz[e]indan-1-one by the procedure described in Example 1. This compound is represented by the following formula

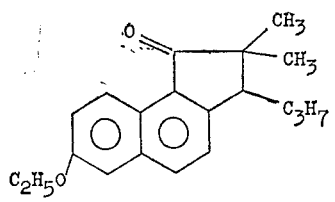

EXAMPLE 6

3 parts of phenylmagnesium bromide and 6 parts of 2,2-dimethyl-3-propyl-7-ethoxy[e]indan-1-one are reacted exactly as described in Example 2. The reaction is worked-up and the product is isolated also as described in Example 2. Recrystallization of the chromatographed product from hexane provides 1-phenyl-2,2-dimethyl-3- propyl-7-ethoxybenz[e]indan-1-ol. The compound is represented by the following formula

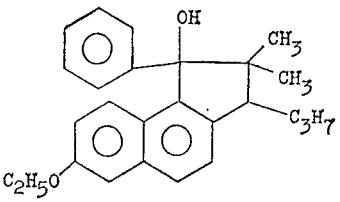

EXAMPLE 7

70 parts of 2,2-diethyl-3-(6-methoxy-2-naphthyl)hexanoic acid is converted to 2,2-diethyl-3-propyl-7-methoxybenz[e]indan-1-one by the procedure described in Example 1. This compound is represented by the following formula

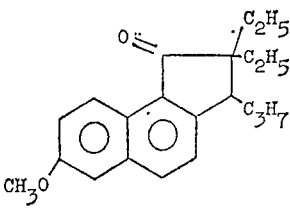

EXAMPLE 8

3 parts of phenylmagnesium bromide and 6 parts of 2,2-diethyl-3-propyl-7-methoxy[e]indan-1-one are reacted exactly as described in Example 2. The reaction is worked-up and the product is isolated also as described in Example 2. Recrystallization of the chromatographed product from hexane provides 1-phenyl-2,2-diethyl-3-propyl-7-methoxybenz[e]indan-1-ol. The compound is represented by the following formula

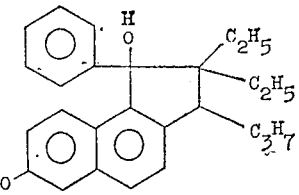

What is claimed is:
1. A compound which has the formula

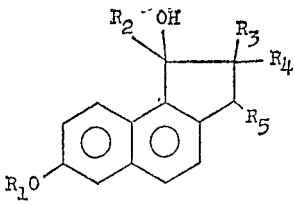

wherein $R_2$ is phenyl or p-halophenyl and $R_1$, $R_3$, $R_4$, and $R_5$ are lower alkyl.

2. A compound according to claim 1, which is 1-phenyl-2,2-dimethyl-3-ethyl-7-methoxybenz[e]indan-1-ol.

3. A compound according to claim 1, which is 1-p-chlorophenyl-2,2-dimethyl - 3 - ethyl-7-methoxybenz[e]indan-1-ol.

References Cited

UNITED STATES PATENTS

| | | | |
|---|---|---|---|
| 2,494,253 | 1/1950 | Miescher et al. | 260—613 R X |
| 3,192,267 | 6/1965 | Nomine et al. | 260—613 R X |

FOREIGN PATENTS

| | | | |
|---|---|---|---|
| 6,528 | 6/1964 | Japan | 260—613 R |

BERNARD HELFIN, Primary Examiner

U.S. Cl. X.R.

260—590, 999